US012039673B2

(12) United States Patent
Palacios

(10) Patent No.: US 12,039,673 B2
(45) Date of Patent: Jul. 16, 2024

(54) AUGMENTED REALITY ARTIFICIAL INTELLIGENCE ENHANCE WAYS USER PERCEIVE THEMSELVES

(71) Applicant: Sony Interactive Entertainment Inc., Tokyo (JP)

(72) Inventor: Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 364 days.

(21) Appl. No.: 17/382,250

(22) Filed: Jul. 21, 2021

(65) Prior Publication Data

US 2023/0025585 A1 Jan. 26, 2023

(51) Int. Cl.
*G06T 19/00* (2011.01)
*A63F 13/52* (2014.01)
(Continued)

(52) U.S. Cl.
CPC ............ *G06T 19/006* (2013.01); *A63F 13/52* (2014.09); *G06F 3/011* (2013.01); *G06F 3/16* (2013.01);
(Continued)

(58) Field of Classification Search
None
See application file for complete search history.

(56) References Cited

U.S. PATENT DOCUMENTS 5,485,172 A 1/1996 Sawachika et al. ............... 345/8
5,800,337 A 9/1998 Gavish ............................. 600/27
(Continued)

FOREIGN PATENT DOCUMENTS

WO 2015183621 A1 12/2015

OTHER PUBLICATIONS

PCT/US2022/036411, Notification of the Transmittal of the International Search Report and the Written Opinion of the International Searching Authority, PCT/ISA/210, dated Oct. 26, 2022.

*Primary Examiner* — Ronald Laneau
(74) *Attorney, Agent, or Firm* — Penilla IP, APC

(57) ABSTRACT

Methods and systems are provided for generating augmented reality (AR) scenes where the AR scenes can be adjusted to modify at least part of an image of the physical features of a user to produce a virtual mesh of the physical features. The method includes generating an augmented reality (AR) scene for rendering on a display for a user wearing AR glasses, the AR scene includes a real-world space and virtual objects overlaid in the real-world space. The method includes analyzing a field of view into the AR scene from the AR glasses; the analyzing is configured to detect images of physical features of the user when the field of view is directed toward at least part of said physical features of the user. The method includes adjusting the AR scene, in substantial real-time, to modify at least part of the images of the physical features of the user when the physical features of the user are detected to be in the AR scene as viewed from the field of view of the AR glasses, wherein said modifying includes detecting depth data and original texture data from said physical features to produce a virtual mesh of said physical features; the virtual mesh is changed in size and shape and rendered using modified texture data that blends with said original texture data. In one embodiment, the modified physical features of the user appear to the user when viewed via the AR glasses as existing in the real-world space. In this way, when the physical features of a user are detected to be in the AR scene, the physical features are augment in the AR scene which can result in the self-perception of the user improving which in turn can provide the user with confidence to overcome challenging tasks or obstacles during the gameplay of the user.

18 Claims, 11 Drawing Sheets

(51) Int. Cl.
  *G06F 3/01*   (2006.01)
  *G06F 3/16*   (2006.01)
  *G06T 7/40*   (2017.01)
  *G06T 7/50*   (2017.01)
  *G06T 17/20*  (2006.01)
  *G06T 19/20*  (2011.01)

(52) U.S. Cl.
  CPC ............... *G06T 7/40* (2013.01); *G06T 7/50* (2017.01); *G06T 17/20* (2013.01); *G06T 19/20* (2013.01); *A63F 2300/8082* (2013.01); *G06T 2207/30196* (2013.01); *G06T 2219/2016* (2013.01); *G06T 2219/2021* (2013.01)

(56) References Cited

U.S. PATENT DOCUMENTS

| | | | |
|---|---|---|---|
| 9,551,873 B2 | 1/2017 | Zalewski | |
| 9,606,363 B2 | 3/2017 | Zalewski | |
| 9,990,774 B2 | 6/2018 | Mao | G06T 19/006 |
| 10,078,917 B1* | 9/2018 | Gaeta | G06F 3/04815 |
| 10,388,071 B2 | 8/2019 | Rico | G06T 19/006 |
| 10,539,787 B2 | 1/2020 | Haddick et al. | G06F 1/163 |
| 10,835,707 B2 | 11/2020 | Sanchez Vives et al. | A61M 21/02 |
| 11,217,024 B2* | 1/2022 | Sztuk | G02B 27/0093 |
| 11,579,752 B1* | 2/2023 | Sarria, Jr. | G06V 20/20 |
| 2011/0213197 A1 | 9/2011 | Robertson et al. | 600/27 |
| 2015/0348327 A1 | 12/2015 | Zalewski | |
| 2016/0209658 A1 | 7/2016 | Zalewski | |
| 2016/0267720 A1* | 9/2016 | Mandella | G06F 3/03545 |
| 2018/0061003 A1 | 3/2018 | Kono et al. | |
| 2019/0188825 A1 | 6/2019 | Kono et al. | |
| 2019/0188826 A1 | 6/2019 | Kono et al. | |
| 2020/0250793 A1 | 8/2020 | Kono et al. | |
| 2023/0063681 A1* | 3/2023 | Palacios | G06T 13/40 |

\* cited by examiner

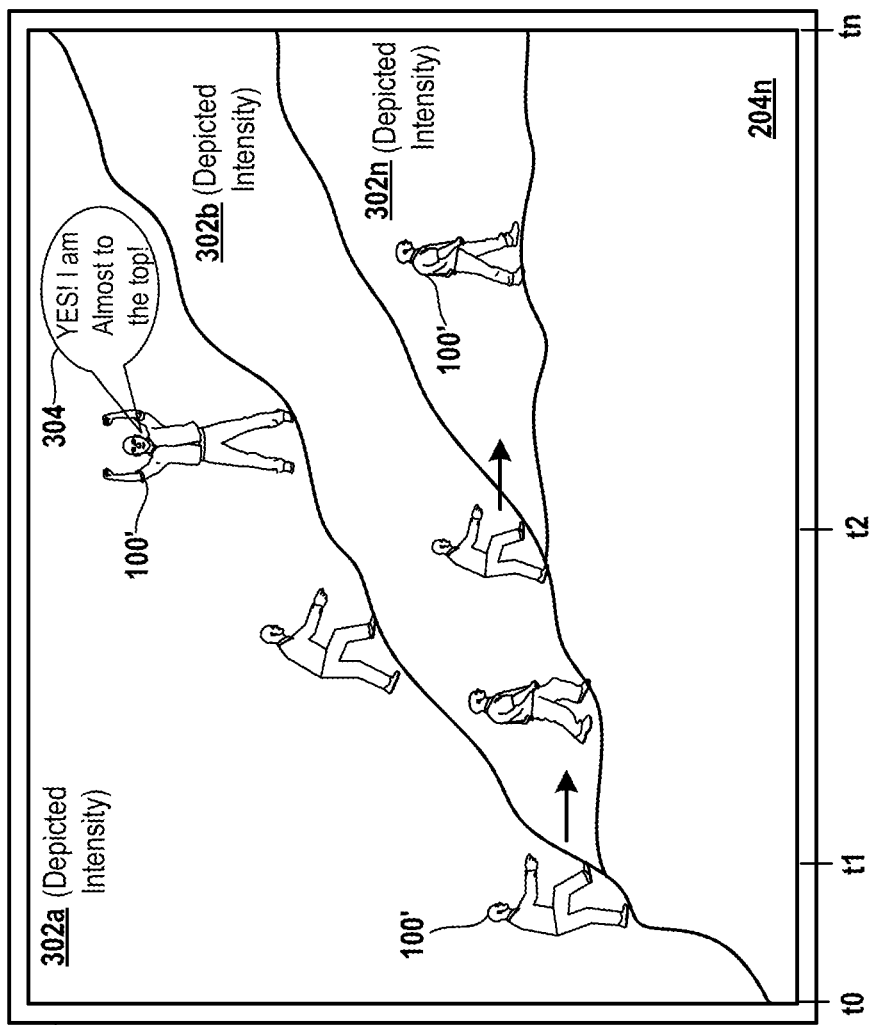
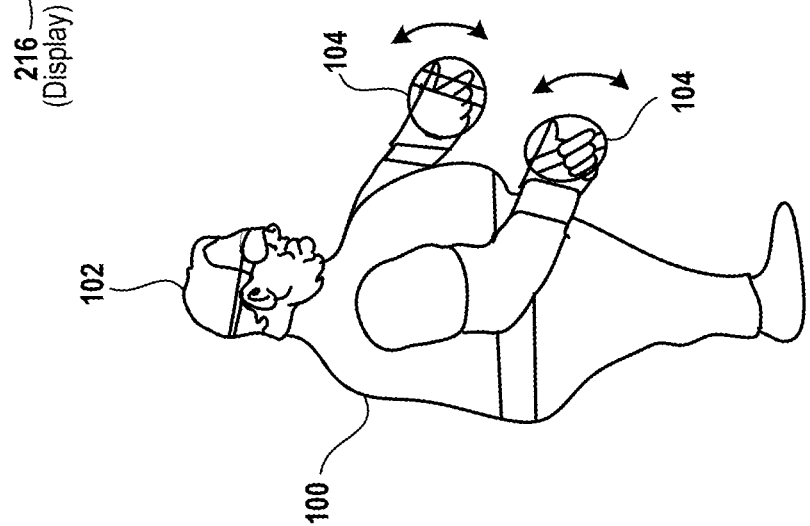
FIG. 3

| Captured Measurements | User-1 100a | User-1 506a Adjusted Values | User-N 100n | User-N 506n Adjusted Values | Range for Healthy Person 508 |
|---|---|---|---|---|---|
| Physiological measurements | | | | | |
| Heart rate (bpm) | 120 | 85 | 135 | 95 | 60 to 100 |
| Blood Pressure (mmHg) | 140/90 | 122/72 | 90/55 | 110/62 | Systolic: 100 and 130 Diastolic: 60-80 |
| Oxygen Saturation | 90 | 98 | 93 | 99 | 95 or higher |
| Respiration (BPM) | 22 | 13 | 20 | 14 | 12 to 16 |
| Body Temperature (F) | 99.5 | 98.2 | 98.1 | 98.6 | 98.6 |
| Physical Measurements | | | | | |
| Height | 5'2" | 6'2" | 5'5" | 5'10" | n/a |
| Body Weight (lbs) | 260 | 205 | 140 | 185 | n/a |
| Body Fat percentage (%) | 45 | 18 | 38 | 15 | 25 |

User Physiological and Physical Adjustments — 502 / 504

FIG. 5

AUGMENTED REALITY ARTIFICIAL INTELLIGENCE ENHANCE WAYS USER PERCEIVE THEMSELVES

BACKGROUND

1. Field of the Disclosure

The present disclosure relates generally to generating an augmented reality (AR) scene, and more particularly to methods and systems for adjusting the AR scene to modify at least part of an image of the physical features of the user to produce a virtual mesh of the physical features which can change in size and shape.

2. Description of the Related Art

Augmented reality (AR) technology has seen unprecedented growth over the years and is expected to continue growing at a compound annual growth rate. AR technology is an interactive three-dimensional (3D) experience that combines a view of the real-world with computer-generated elements (e.g., virtual objects) in real-time. In AR simulations, the real-world is infused with virtual objects and provides an interactive experience. With the rise in popularity of AR technology, various industries have implemented AR technology to enhance the user experience. Some of the industries include, for example, video games, shopping & retail, education, entertainment, healthcare, real estate, virtual assistance, etc.

For example, a growing trend in the video game industry is to incorporate AR gaming where the AR game superimposes a pre-created environment on top of a user's actual environment. AR gaming enhances the gaming experience of the user which keeps the games interesting since new AR scenes can be generated based on the real-world environment of the user. In another example, a growing trend is to incorporate AR technology into sophisticated tools and operations that may assist a user with various personal tasks, e.g., navigation & visual guidance, etc. Unfortunately, some users may find that current AR technology that are used in gaming are unable to encourage the user to continue with their gameplay when they may be discouraged by specific challenges or objects in the gameplay.

It is in this context that implementations of the disclosure arise.

SUMMARY

Implementations of the present disclosure include methods, systems, and devices relating to generating augmented reality (AR) scenes for rendering on a display of a user wearing AR glasses. In some embodiments, methods are disclosed to enable adjusting the AR scenes where images of the physical features of a user are modified in substantial real-time to produce a virtual mesh of the physical features of the user. In some embodiments, the virtual can change in size and shape to augment the perception of an avatar of the user in the AR environment. For example, a user may be wearing AR glasses (e.g., AR head mounted display) and immersed in an AR environment that includes both real-world objects and virtual objects. While interacting with various AR scenes of the AR environment, the system may be configured to detect images of physical features (e.g., hands, arms, shoulders, thorax, legs, height, weight, etc.) of the user (or other users) in the AR environment when the field of view of the user is directed toward at least part of the physical features of the user. In one embodiment, the system is configured to modify at least part of the images of the physical features of the user to augment the appearance of the physical features. In one embodiment, modifying the images of the physical features may change the size and shape of the physical features, e.g., making it appear that the avatar of the user in the AR scene larger physical stature such as having muscular arms, muscular legs, broader shoulders, etc. Since the AR scenes can include various physical features of the user that are modified to enhance the appearance of the user, the methods disclosed herein outline ways of augmenting the appearance of the user in an AR scene so that the self-esteem of the user improves which can result in the user being more confident and less intimated when interacting with the various game tasks in the AR environment. It is believed that encouraging the user and/or raising their self-esteem during gaming or interfacing with computer systems, the positive effects may act to improve the user's physiological mindset and possibly overall mental health.

Thus, as a user interacts with the AR scenes in an AR environment, the physical features of the user (or other users) that are detected to be in the AR scene can be modified in substantial real-time to produce a virtual mesh which can change in size and shape for rendering on the display of the user. In this way, as the user interacts with the AR scene, the self-perception of the user is improved which allows the user to proceed confidently with their gameplay. Thus, users can proceed in the gameplay confidently without feeling discouraged since their appearance in the AR scene is modified to appear as a robust game character, e.g., stronger, taller, faster, healthier, etc. In some embodiments, the physical features of other users (e.g., teammates) can be modified. In other embodiments, the perception of a challenging game task or an intimidating environment can be modified reduce its depicted intensity to make it appear less intimidating. In this way, users who may be on the verge of giving up with their gameplay because the gameplay appears intimating and difficult accomplish will be motivated to continue with their gameplay In one embodiment, a computer-implemented method is provided. The method includes generating an augmented reality (AR) scene for rendering on a display for a user wearing AR glasses, the AR scene includes a real-world space and virtual objects overlaid in the real-world space. The method includes analyzing a field of view into the AR scene from the AR glasses; the analyzing is configured to detect images of physical features of the user when the field of view is directed toward at least part of said physical features of the user. The method includes adjusting the AR scene, in substantial real-time, to modify at least part of the images of the physical features of the user when the physical features of the user are detected to be in the AR scene as viewed from the field of view of the AR glasses, wherein said modifying includes detecting depth data and original texture data from said physical features to produce a virtual mesh of said physical features; the virtual mesh is changed in size and shape and rendered using modified texture data that blends with said original texture data. In one embodiment, the modified physical features of the user appear to the user when viewed via the AR glasses as existing in the real-world space. In this way, when the physical features of a user are detected to be in the AR scene, the physical features are augment in the AR scene which can result in the self-perception of the user improving which in turn can provide the user with confidence to overcome challenging tasks or obstacles during the gameplay of the user.

In another embodiment, a system for displaying an AR scene is provided. The system includes an AR head mounted display (HMD); said AR HMD includes a display for rendering the AR scene for a user wearing AR glasses. In one embodiment, AR scene includes a real-world space and virtual objects overlaid in the real-world space; and the AR HMD configured to analyze a field of view into the AR scene from the AR glasses. In one embodiment, the analyzing is configured to detect images of physical features of the user when the field of view is directed toward at least part of said physical features of the user. The system includes a processing unit associated with the AR HMD for adjusting the AR scene in substantial real-time to modify at least part of the images of the physical features of the user when the physical features of the user are detected to be in the AR scene as viewed from the field of view of the AR glasses. In one embodiment, the modifying includes detecting depth data and original texture data from said physical features to produce a virtual mesh of said physical features; the virtual mesh is changed in size and shape and rendered using modified texture data that blends with said original texture data. In one embodiment, the modified physical features of the user appear to the user when viewed via the AR glasses as existing in the real-world space. The system includes a tracking unit associated with the AR HMD for tracking the field of view into the AR scene from the AR glasses; the tracking is configured to identify movements of the physical features of the user for further adjusting of the AR scene in substantial real-time to incorporate the movements of the physical features in the adjusted AR scene.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 3 illustrates an embodiment of a view into an AR environment of a user showing the user interacting with an AR scene while wearing an AR HMD and operating interface objects to provide input for the AR scene, in accordance with implementations of the disclosure.

FIG. 5 illustrates an embodiment of a table that includes various captured measurements that correspond to a user during the user's interaction with AR scenes of an AR environment, in accordance with implementations of the disclosure.

DETAILED DESCRIPTION

Figure 1A:
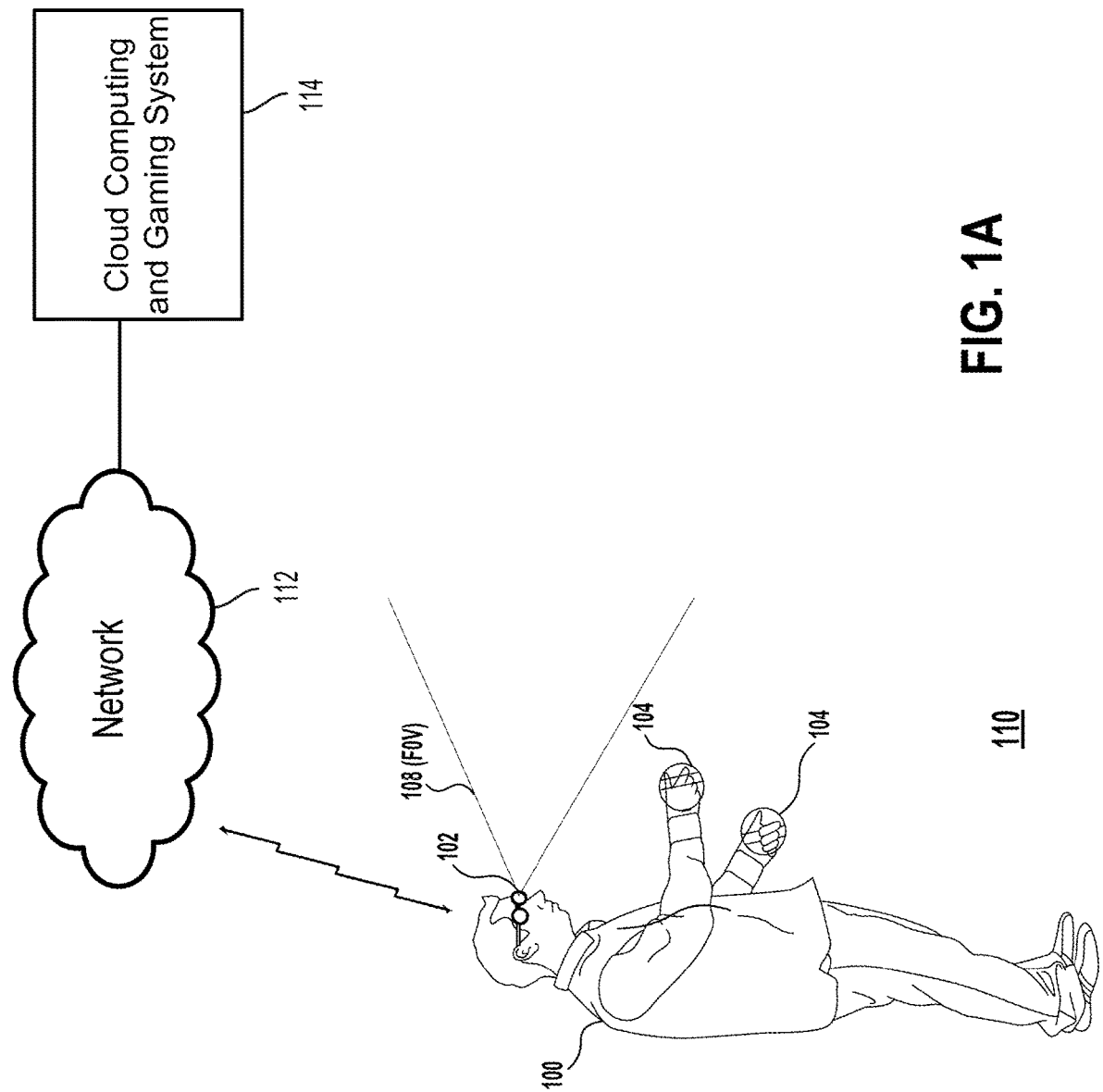
FIG. 1A illustrates an embodiment of a system for interaction with an augmented reality (AR) environment via an AR head-mounted display (HMD), in accordance with an implementation of the disclosure.

The following implementations of the present disclosure provide methods, systems, and devices for generating augmented reality (AR) scenes for a user of an AR head mounted display (HMD) and adjusting the AR scenes in substantial real-time to modify images of the physical features of the user when the physical features of the user are detected to be in the AR scenes. In some embodiments, the physical features of a user may correspond to the user's build, height, weight, muscle composition, complexion, age, gender, physiological measurement, etc. In one embodiment, the modification of the physical features may include detecting depth data and original data from the physical features to produce a virtual mesh of the physical features where the virtual mesh can change in size and shape for rendering on the display of the user.

For example, while a user is interacting with an AR scene, if the field of view of the AR glasses of the user captures the user's arms, the system can dynamically modify the arms of the user to change its appearance in the AR scene making it appear larger and more muscular compared to the real-world arms of the user. Accordingly, as the AR scenes are adjusted in substantial real-time to modify the physical features of the user, this enables an enhanced and improved AR gaming experience for a user since the user may perceive him or herself as being more confident with their physical attributes when interacting with various game tasks and other game characters in the AR environment. This allows the user to progress through the AR scenes more confidently without being discouraged by other game characters or obstacles in the game scenes that may have been previously been intimating to the user. In turn, this can enhance the AR experience for users who may lack self-confidence and allow the users to fully enjoy the immersive experience of the AR environment without feeling discouraged.

By way of example, in one embodiment, a method is disclosed that enables generating AR scenes and adjusting the AR scenes in substantial real-time to modify images of the physical features of a user when the physical features of the user are detected to be in the AR scenes. The method includes generating an augmented AR scene for rendering on a display for a user wearing AR glasses, the AR scene includes a real-world space and virtual objects overlaid in the real-world space. In one embodiment, the method may further include analyzing a field of view into the AR scene from the AR glasses. In one example, the analyzing is configured to detect images of physical features of the user when the field of view is directed toward at least part of said physical features of the user. In another embodiment, the method may include adjusting the AR scene, in substantial real-time, to modify at least part of the images of the physical features of the user when the physical features of the user are detected to be in the AR scene as viewed from the field of view of the AR glasses. In one example, modifying the images of the physical features includes detecting depth data and original texture data from the physical features to produce a virtual mesh of the physical features. In one embodiment, the virtual mesh is changed in size and shape and rendered using modified texture data that blends with the original texture data. In another embodiment, the modified physical features of the user appear to the user when viewed via the AR glasses as existing in the real-world space.

In accordance with one embodiment, a system is disclosed for generating AR scenes and adjusting the AR scenes in substantial real-time to modify at least part of the images of the physical features of a user when the physical features of the user are detected to be in the AR scene. For example, a user may be using AR goggles to interact in an AR environment which includes various AR scenes generated by a cloud computing and gaming system. While viewing and interacting with the AR scenes through the display of the AR goggles, the system is configured to analyze a field of view into the AR scene from the AR glasses and to detect images of physical features of the user or any additional users that are within the field of view.

In one embodiment, the system is configured to modify at least part of the images of the physical features of the user when the physical features of the user are detected to be in the AR scene as viewed from the field of view of the AR glasses. For example, the physical features may be associated with the user or any other users that are viewed from the field of view of the AR glasses. In one embodiment, the modification of the physical features of the user may include detecting depth data and original texture data from the physical features to produce a virtual mesh. In some embodiments, the virtual mesh can change in size and shape where the size and shape are selected based on a model. In some embodiments, the model may be able to receive as inputs a profile of the user, user captured physiological measurements, and gameplay data. In other embodiments, the system is configured to monitor and capture the user's physiological measurements (e.g., heart rate, body temp, blood pressure, etc.) and dynamically adjust the depicted intensity of an AR scene to change the user's perception of a challenging task or objective in the AR scene. In this way, the user's self-confidence can be improved which may result in the user being more confident when interacting with AR scenes that may initially appear intimating.

In some embodiments, augmented reality (AR) is used to change the idea of how a person perceives themselves to others. For example, this can include, e.g., using augmented reality or a form of mixed reality, to change the user's own i) physiological metrics (e.g., respiration patterns, heart rate or body temperature by changing slightly the color of skin because blood flow or temperature changes, adding drops of sweat); ii) proprioception (e.g., location of body parts, additional body extremities, etc.); iii) changing the way the user hears their own voice and others. In one embodiment, these computer generated modifications can be applied to gaming. In one example, the user can perceive him or herself as a very strong game character. In some cases, these modifications can assist to encourage user behavior (e.g., people with eating disorders, smokers, lack of physical exercise, etc.)

In another embodiment, in a local multiplayer game, the user can select a character. The systems can use AR to change the appearance of the user and/or of the teammate. In some cases, the teammate may be sitting next to the user on the coach, but will be viewed differently based on the applied AR modification. Your teammate can look, be dressed, sound, etc. as one of the characters from a game.

In still another embodiment, AR can be used to change how the user perceives a challenging task or environment. For example, if the user is climbing a hill, AR and/or mixed reality or VR can be used to make it look like it is less steep, or that the user is getting closer to the top of the hill. In one configuration, the user and/or system can dynamically change the way the user perceives themselves at different times in the game and/or interactivity with a program. It should be understood that embodiments described herein can apply to gaming technology and non-gaming technology.

With the above overview in mind, the following provides several example figures to facilitate understanding of the example embodiments.

FIG. 1A illustrates an embodiment of a system for interaction with an augmented reality environment via an AR head-mounted display (HMD) 102, in accordance with implementations of the disclosure. As used herein, the term "augmented reality" generally refers to user interaction with an AR environment where a real-world environment is enhanced by computer-generated perceptual information (e.g., virtual objects). An AR environment may include both real-world objects and virtual objects where the virtual objects are overlaid onto the real-world environment to enhance the experience of a user 100. In one embodiment, the AR scenes of an AR environment can be viewed through a display of a device such as an AR HMD, mobile phone, or any other device in a manner that is responsive in real-time to the movements of the AR HMD (as controlled by the user) to provide the sensation to the user of being in the AR environment. For example, the user may see a three-dimensional (3D) view of the AR environment when facing in a given direction, and when the user turns to a side and thereby turns the AR HMD likewise, and then the view to that side in the AR environment is rendered on the AR HMD.

As illustrated in FIG. 1A, a user 100 is shown physically located in a real-world space 110 wearing an AR HMD 102 and operating interface objects 104 to provide input for the video game. In one embodiment, the AR HMD 102 is worn in a manner similar to glasses, goggles, or a helmet, and is configured to display AR scenes, video game content, or other content to the user 100. The AR HMD 102 provides a very immersive experience to the user by virtue of its provision of display mechanisms in close proximity to the user's eyes. Thus, the AR HMD 102 can provide display regions to each of the user's eyes which occupy large portions or even the entirety of the field of view of the user, and may also provide viewing with three-dimensional depth and perspective.

In some embodiments, the AR HMD 102 may include an externally facing camera that is configured to capture images of the real-world space of the user 100 such as real-world objects that may be located in the real-world space 110 of the user. In some embodiments, the images captured by the externally facing camera can be analyzed to determine the location/orientation of the real-world objects relative to the AR HMD 102. Using the known location/orientation of the AR HMD 102, the real-world objects, and inertial sensor data from the AR HMD, the physical actions and movements of the user can be continuously monitored and tracked during the user's interaction. In some embodiments, the externally facing camera can be an RGB-Depth sensing camera or a three-dimensional (3D) camera which includes depth sensing and texture sensing so that 3D models can be created. The RGB-Depth sensing camera can provide both color and dense depth images which can facilitate 3D mapping of the captured images.

In some embodiments, the AR HMD 102 may provide a user with a field of view (FOV) 108 into the AR scene. Accordingly, as the user 100 turns their head and looks toward different regions within the real-world space 110, the AR scene is updated to include any additional virtual objects and real-world objects that may be within the FOV 108 of the user 100. In one embodiment, the AR HMD 102 may include a gaze tracking camera that is configured to capture images of the eyes of the user 100 to determine the gaze direction of the user 100 and the specific virtual objects or real-world objects that the user 100 is focused on. Accordingly, based on the FOV 108 and the gaze direction of the user 100, the system may detect specific objects that the user may be focused on, e.g., game characters, teammates, obstacles, etc.

In the illustrated implementation, the AR HMD 102 is wirelessly connected to a cloud computing and gaming system 114 over a network 112. In one embodiment, the cloud computing and gaming system 114 maintains and executes the AR scenes and video game being played by the user 100. In some embodiments, the cloud computing and gaming system 114 is configured to receive inputs from the AR HMD 102 over the network 112. The cloud computing and gaming system 114 is configured to process the inputs to affect the state of the AR scenes of the AR environment. The output from the executing AR scenes, such as virtual objects, real-world objects, video data, audio data, and user interaction data, is transmitted to the AR HMD 102. In other implementations, the AR HMD 102 may communicate with the cloud computing and gaming system 114 wirelessly through alternative mechanisms or channels such as a cellular network.

Figure 1B:
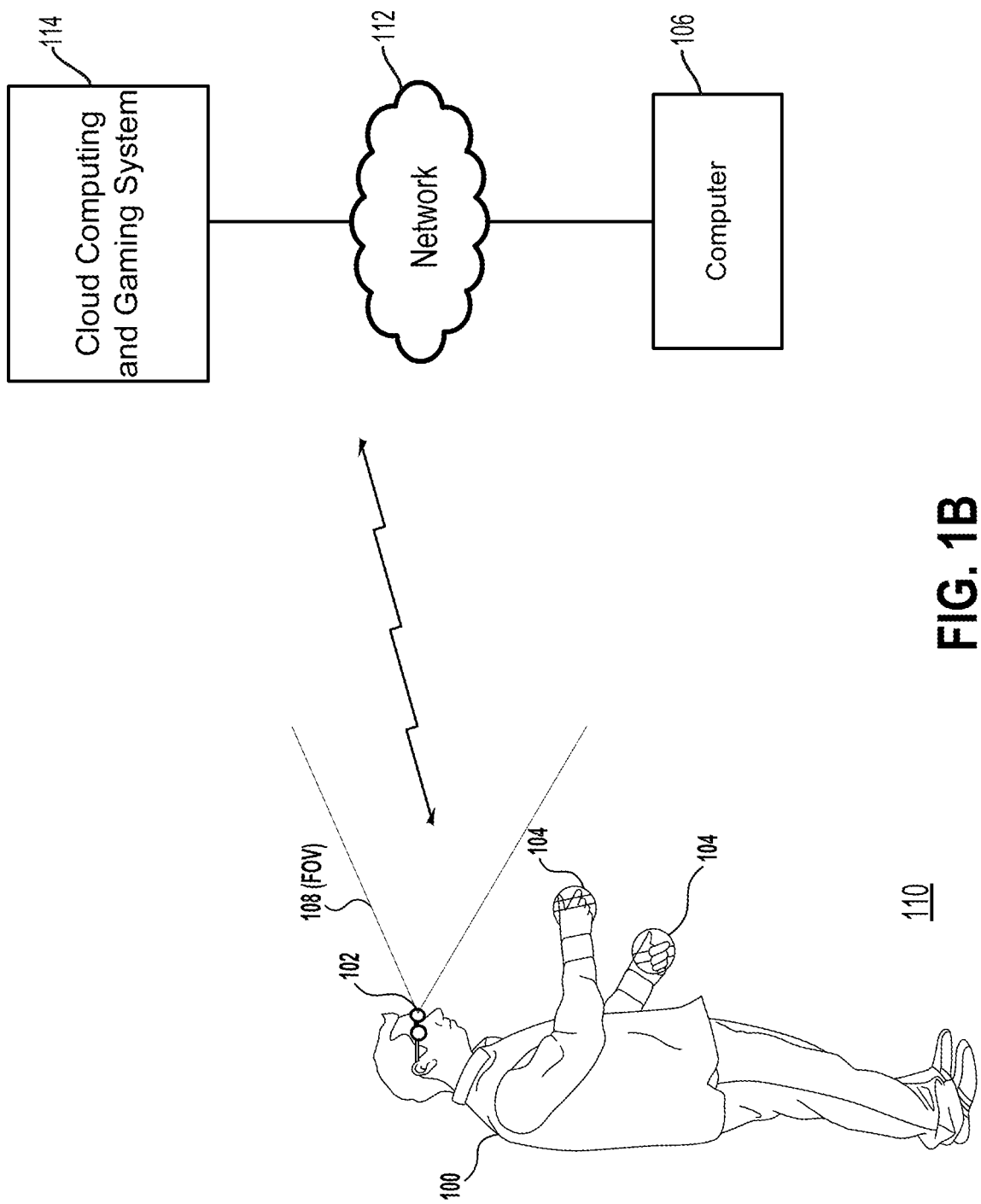
FIG. 1B illustrates another embodiment of a system for interaction with an AR environment via an AR HMD, in accordance with implementations of the disclosure.

FIG. 1B illustrates another embodiment of a system for interaction with an AR environment via an AR HMD 102, in accordance with implementations of the disclosure. As illustrated, the user 100 is shown physically located in a real-world space 110 wearing an AR HMD 102 and operating interface objects 104 while interacting with AR scenes of the AR environment. In the illustrated implementation, the AR HMD 102 is wirelessly connected to a computer 106. In other implementations, the AR HMD 102 is connected to the computer 106 through a wired connection. The computer 106 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the AR HMD 102. In some implementations, the computer 106 is configured to execute any other type of interactive application that provides a virtual space/environment that can be viewed through an HMD. In some implementations, the AR HMD 102 may also communicate with the computer 106 through alternative mechanisms or channels, such as via a network 112 to which both the HMD 102 and the computer 106 are connected.

As noted above, the AR HMD 102 may include an externally facing camera that is configured to capture images of the real-world space of the user 100 such as real-world objects that may be located in the real-world space 110 of the user. In some embodiments, the AR HMD 102 may provide a user with a field of view (FOV) 108 into the AR scene. In this way, when the FOV 108 is directed toward various real-world objects and virtual objects, the system is configured to analyze and determine the type of images that are captured within the FOV 108. For example, if the user 100 looks in a direction toward their arms and legs, the system can detect and distinguish between the arms and legs of the user and analyze the depth data and texture that is associated with the various physical features of the user, e.g., arms, legs, abdominals, etc.

In some embodiments, the user 100 may operate interface objects 104 to provide input for the video game. In various implementations, the interface objects 104 include a light which can be tracked, and/or inertial sensor(s), to enable determination of the interface object's location and orientation and tracking of movements. In other implementations, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the AR HMD 102.

In some embodiments, the AR HMD 102 and the real-world space 110 can include one or more microphones to capture sound from the physical environment in which the user 100 is located. Sound captured by a microphone array may be processed to identify the location of a sound source. Sound from an identified location can be selectively utilized or processed to the exclusion of other sounds not from the identified location. In other embodiments, sound captured by the microphones may be processed to determine the physiological measurements associated with the user 100, e.g., heart rate, blood pressure, respiration, etc.

Additionally, though implementations in the present disclosure may be described with reference to an AR HMD 102, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations.

Figure 2B:
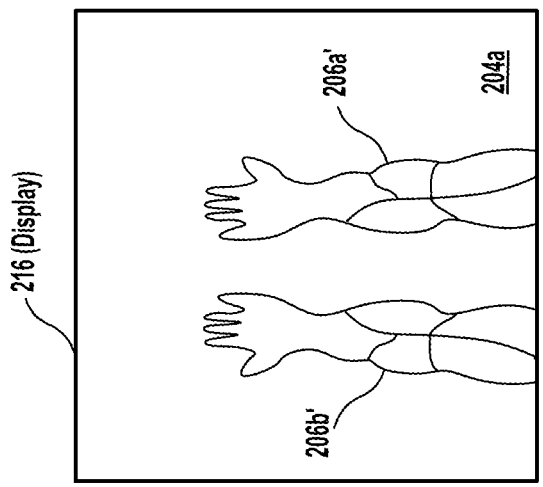
FIGS. 2A-2B illustrate an embodiment of a user wearing AR glasses while operating interface objects to interact with an AR scene and an adjusted AR scene that is generated in substantial real-time to include a modified image of the real arms of the user, in accordance with implementations of the disclosure.
Figure 2A:
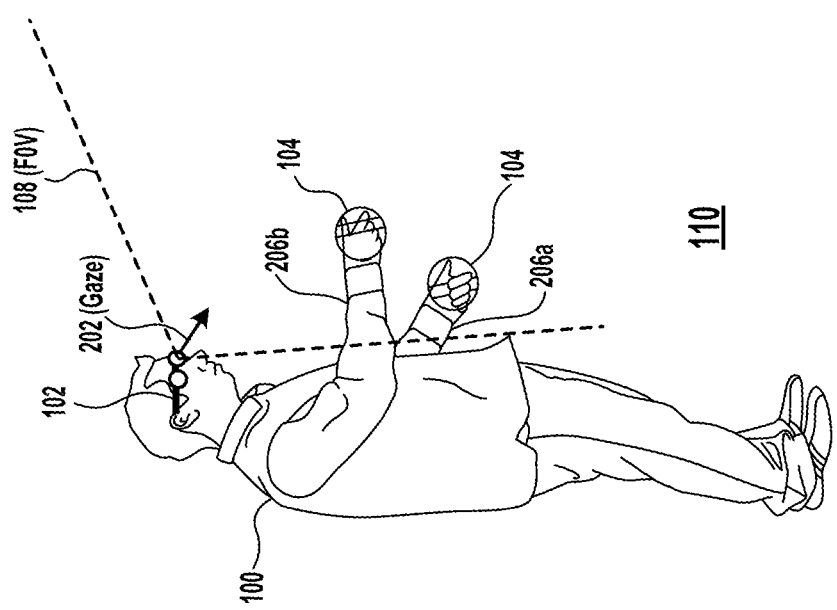

FIGS. 2A-2B illustrate an embodiment of a user 100 wearing AR glasses 102 while operating interface objects 104 to interact with an AR scene and an adjusted AR scene 204a that is generated in substantial real-time to include a modified image of the real arms 206a-206b of the user 100. As illustrated in FIG. 2A, a user 100 is shown physically located in a real-world space 110 wearing an AR HMD 102 and operating interface objects 104 to provide input to interact with AR scenes of an AR environment. In some embodiments, the system is configured to analyze the FOV 108 into the AR scene to detect images of real-world objects in the real-world space 110. In other embodiments, the system is configured to analyze the FOV 108 into the AR scene to detect images of physical features (e.g., arms, hands, biceps, abdominals, legs, etc.) of the user when the FOV is directed toward the user. For example, as illustrated in FIG. 2A, a gaze direction 202 of the user 100 is directed towards the real arms 206a-206b of the user 100. Accordingly, the system can determine that the AR scene includes the real arms 206a-206b of the user 100.

In some embodiments, with reference to FIG. 2B, the system is configured to generate an adjusted AR scene 204a in substantial real-time which can be viewed on the display 216 of the AR glasses 102 of the user 100. As illustrated, the adjusted AR scene 204a is a view from the display 216 the user 100 when the gaze direction 202 of the user is directed towards the user's arms. In one embodiment, the adjusted AR scene 204a may include modified images of the physical features of the user when the physical features of the user are detected to be in the AR scene. For example, with reference to FIG. 2A, after the system determines that the AR scene includes the real arms 206a-206b of the user 100, the system is configured to adjust the AR scene to generate the adjusted AR scene 204a which includes virtual arms 206a'-206b'. In one embodiment, the virtual arms 206a'-206b' are a virtual representation of the real arms 206a-206b which have been modified and viewable via the AR glasses.

In the illustrated example shown in FIG. 2B, the size and shape of virtual arms 206a'-206b' is a modification of the of the real arms 206a-206b which results in the virtual arms 206a'-206b' being larger and more muscular relative to the real arms 206a-206b of the user. For example, the virtual arms 206a'-206b' may have more muscle mass, greater muscle definition, greater girth, a lower body fat parentage, and be longer than the real arms 206a-206b of the user. In this way, when a user observes themselves via the AR HMD, the user 100 may feel more confident when engaging with enemy game characters because their virtual arms 206a'-206b' appear more intimidating to others in the AR scene.

In one embodiment, the modification of the physical features (e.g., real arms 206a-206b) of the user may include detecting depth data and original texture data from the physical features to produce a virtual mesh of the physical features. In some embodiments, the externally facing camera is configured to detect the depth data and original texture data associated with the physical features and other objects within its FOV. In one embodiment, the virtual mesh can change in size and shape and can be rendered as a virtual object using modified texture data that blends with the original texture data. For example, referring simultaneously to FIGS. 2A and 2B, after the externally facing camera of the AR HMD 102 detects the depth data and the original texture associated with the real arms 206a-206b of the user 100, the system produces a virtual mesh of the real arms 206a-206b. Using the virtual mesh of the real arms 206a-206b, the system can change the size and shape of the virtual mesh to produce the virtual arms 206a'-206b' which includes a blend of the original texture data and modified texture data.

In some embodiments, the physical features and real-world objects may include three-dimensional features such as depth data. In one embodiment, the depth data can be used to generate a wire frame model of the corresponding physical feature and real-world object. In some embodiments, when modifying the physical features of the user, the system is configured to use the original depth data as a baseline to produce the modified image of the physical features. In other embodiments, the physical features and real-world objects may include various surface parameters such as original texture data, surface contours, wrinkles, folds, creases, etc.

For example, each user 100 may have a unique and different texture associated with their skin that is visually and physically distinguishable, e.g., soft, smooth, rough, dry, flaky cracked, etc. In some embodiments, the modified physical features of the user blends the original texture data with the modified texture data to produce a virtual mesh where the transition along the boundary of the original texture and the modified texture is seamless and appears dynamically integrated with one another.

In some embodiments, the virtual mesh may include data that uses references points in the X, Y, and Z geometric coordinates to define the height, width, and depth of a 3D model. In some embodiments, the virtual mesh can be rendered in the AR scene to represent the physical features of the user in 3D. In some embodiments, the virtual mesh can change in size and shape and be deformed to achieve a particular configuration.

Figure 2D:
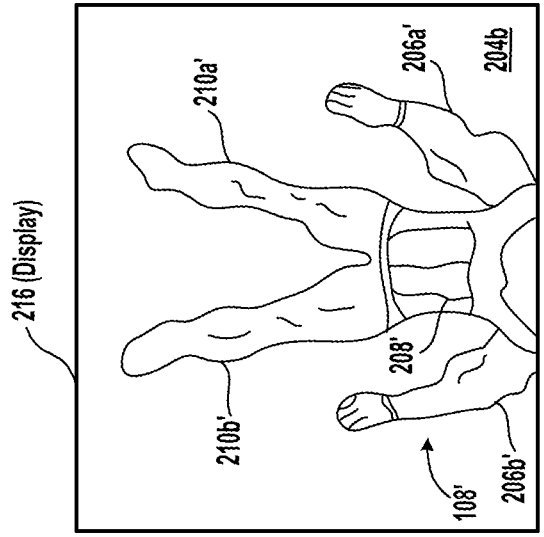
FIGS. 2C-2D illustrate an embodiment of a user wearing AR glasses while operating interface objects to interact with an AR scene and an adjusted AR scene that is generated in substantial real-time to include a modified image of the body of the user, in accordance with implementations of the disclosure.
Figure 2C:
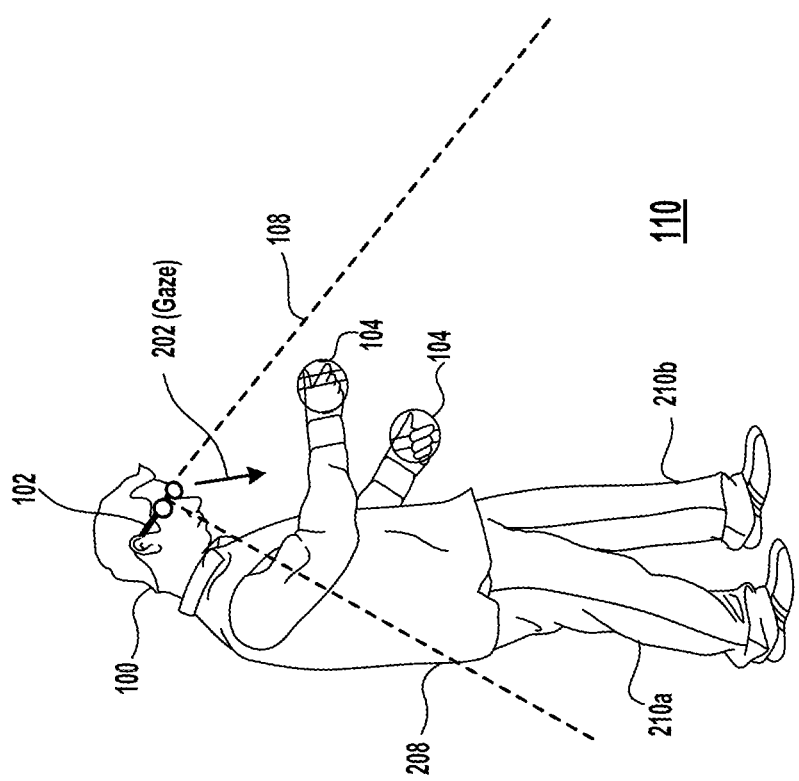

FIGS. 2C-2D illustrate an embodiment of a user 100 wearing AR glasses 102 while operating interface objects 104 to interact with an AR scene and an adjusted AR scene 204b that is generated in substantial real-time to include a modified image of the body of the user. As illustrated in FIG. 2C, a user 100 is shown physically located in a real-world space 110 wearing an AR HMD 102 and operating interface objects 104 to provide input to interact with AR scenes of an AR environment. As illustrated in FIG. 2C, a gaze direction 202 of the user 100 is directed towards the user's midsection and lower extremities. Accordingly, the system can determine that the AR scene includes the user's real arms, abdominals, and legs.

In some embodiments, with reference to FIG. 2D, the system is configured to generate an adjusted AR scene 204b in substantial real-time which can be viewed on the display 216 of the AR glasses 102 of the user 100. As illustrated, the adjusted AR scene 204b is a view from the user's FOV via the display 216 of the AR glasses 102. In one embodiment, the adjusted AR scene 204b may include modified images of the physical features of the user when the physical features of the user are detected to be in the AR scene. In particular, the adjusted AR scene 204b includes a virtual body 103' representing the body of the user 100 which includes the virtual arms 206a'-206b', virtual abdominals 208', and virtual legs 210a'-210b'. In the illustrated example shown in FIG. 2D, the virtual arms 206a'-206b' is a modification of the of the real arms 206a-206b where the size and shape of the real arms is modified to produce the virtual arms 206a'-206b' which appear larger and more muscular relative to the real arms 206a-206b.

In another example, virtual abdominals 208' is a modification of the abdominals 208 of the user where the size and shape of the abdominals is adjusted to generate the virtual abdominals 208' which appears more muscular and defined relative to the real abdominals 208 of the user. In yet another example, virtual legs 210a'-210b' is a modification of the of the real legs 210a-210b where the size and shape of the real legs are adjusted to produce the virtual legs 210a'-210b' which appears larger and more muscular relative to the real legs 210a-210b. In this way, an avatar representing the user in the AR scene results in the avatar having a virtual body 103' that appears more athletic and stronger than the body of the user 100. This may result in the user 100 feeling more confident which may encourage the user 100 to take on challenges and tasks in the AR scene that the user 100 may be intimidated by.

Figure 2F:
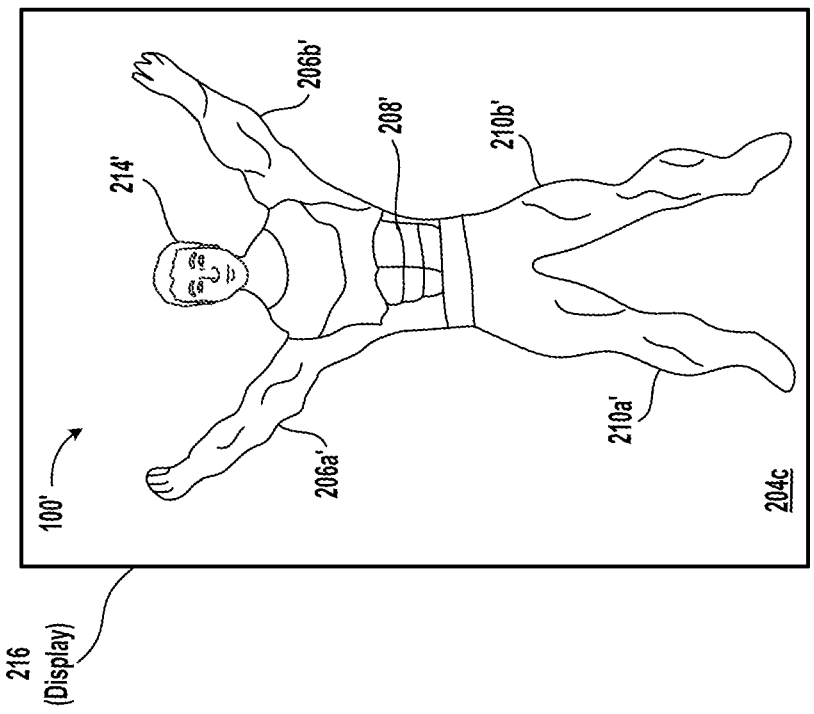
FIGS. 2E-2F illustrate an embodiment of a user wearing AR glasses to interact with an AR scene and an adjusted AR scene that is generated in substantial real-time to include a modified image of the body of the user, in accordance with implementations of the disclosure.
Figure 2E:
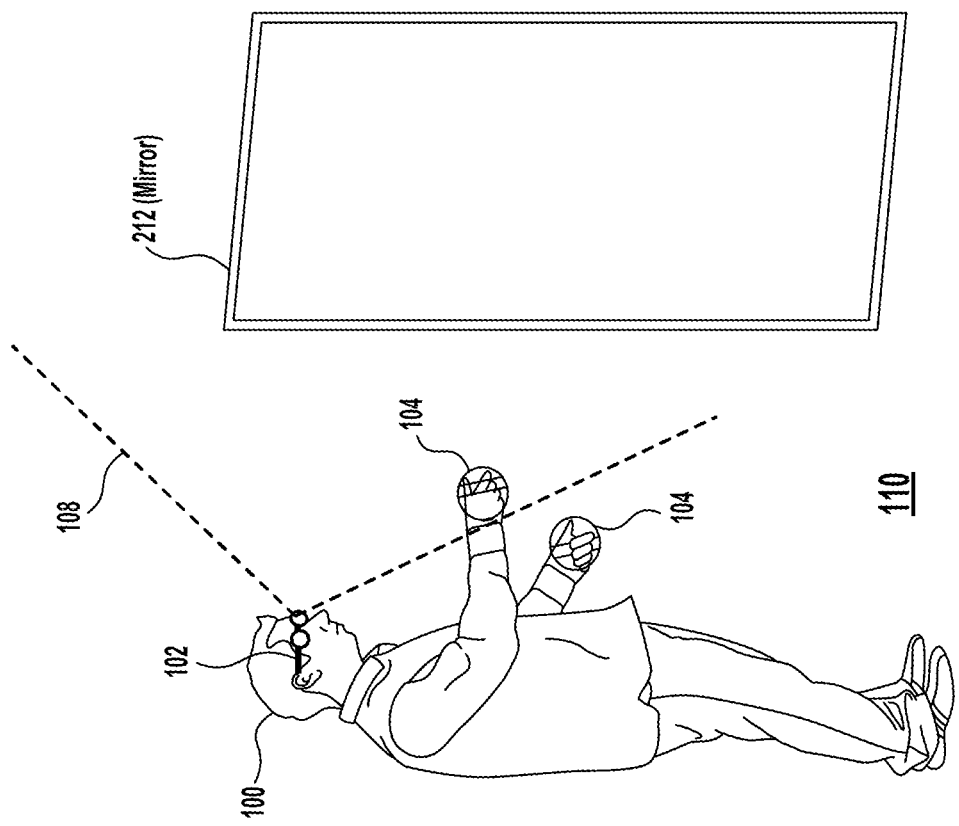

FIGS. 2E-2F illustrate an embodiment of a user 100 wearing AR glasses 102 to interact with an AR scene and an adjusted AR scene 204c that is generated in substantial real-time to include a modified image of the body of the user. As illustrated in FIG. 2E, a user 100 is shown physically located in a real-world space 110 wearing an AR HMD 102 and operating interface objects 104 to provide input to interact with AR scenes of an AR environment. In particular, the user 100 is shown standing in front of a real-world mirror 212 and can view their reflection on the mirror.

In some embodiments, with reference to FIG. 2F, the system is configured to generate an adjusted AR scene 204*c* in substantial real-time which can be viewed via the display 216 of the AR glasses 102 of the user 100. As illustrated, the adjusted AR scene 204*c* shows an avatar 100' of the user which may further include modified images of the physical features of the user when the physical features of the user are detected to be in the AR scene. In particular, the adjusted AR scene 204*c* includes the virtual arms 206*a'*-206*b'*, virtual abdominals 208', virtual legs 210*a'*-210*b'*, and virtual hair 214' of the user.

As noted above, the modification of the physical features (e.g., real arms, real legs, real abdominals, etc.) of the user may include detecting depth data and original texture data from the physical features to produce a virtual mesh of the physical features where the virtual mesh can change in size and shape. As shown in FIG. 2F, the produced virtual mesh represents the virtual body of the avatar 100' of the user which includes the virtual arms 206*a'*-206*b'*, virtual abdominals 208', virtual legs 210*a'*-210*b'*, and virtual hair 214' of the user. Accordingly, the modification of the physical features of the user in the AR scene can be modified to look or a appear a certain way so that users can feel more confident with themselves when accomplishing a goal, mission, obstacle, or task in the AR scene.

FIG. 3 illustrates an embodiment of a view into an AR environment of a user 100 showing the user 100 interacting with an AR scene while wearing an AR HMD 102 and operating interface objects 104 to provide input for the AR scene. In the illustrated example, a display 216 of the AR HMD 102 shows an AR scene 204*n* of a video game that involves the user racing up a hill. In one embodiment, a camera on the AR HMD 102 and the interface objects 104 can be used to monitor the physical actions of the user while the user is wearing the HMD and interacting with the AR scene 204*n* during the gameplay. For example, the physical actions of the user may include body movements of the user, speed of the body movements, facial expressions, voice output of the user, gaze direction of the user, gesture of the user, controller input of the user, controller clicking speed, etc. In other embodiments, the sensors of the AR HMD 102 and the interface objects 104 are configured to capture the physiological measurements of the user 100 during gameplay. In one embodiment, the physiological measurements may include various measurements that correspond to the user such as heart rate, blood pressure, oxygen saturation, body temperature, etc.

For example, the user 100 illustrated in FIG. 3 may live a sedentary lifestyle and have an interest in AR related video games. During the user's gameplay, the user may be sweating profusely and the system may capture the physiological measurements of the user which may indicate that the heart rate, respiration, and body temperature of the user is significantly higher than the average user. In some embodiments, the system is configured to determine the emotion of the user to determine whether the user is enjoying their gameplay. In one embodiment, a camera of the AR HMD 102 may be configured to track and capture the facial expressions of the user 100 during the gameplay which is analyzed to determine an emotion associated with the facial expression. In some embodiments, both the physical actions of the user and the physiological measurements can be used to determine the emotion of the user. In the illustrated example shown in FIG. 3, the system may determine that the user is making a facial expression indicates that the user is fatigued. Since the user 100 is experiencing a significantly high heart rate and that the user looks fatigued, it can be inferred that the user is struggling and may be discouraged to continue with the gameplay.

Accordingly, in some embodiments, the system is configured to adjust a depicted intensity of the gameplay to encourage the user to continue playing the video game. Referring to the display 216 in FIG. 3, the AR scene 204*n* illustrates an avatar 100' of the user racing up a hill along three depicted intensities 302*a*-302*n* with a corresponding path that the avatar 100' of the user may take. In the illustrated example, the AR scene 204*n* illustrates a total of three depicted intensities 302*a*-302*n* that can be introduced to the user 100 at any point in time during the gameplay. In one embodiment, each of the depicted intensities 302*a*-302*n* may provide the user 100 with a perception of how challenging or difficult a game task in the AR scene may be to the user.

For example, depicted intensity 302*a* which includes a path with the greatest incline may appear to be the most challenging to the user 100 it has an incline that is greater than the path associated with the depicted intensity 302*b* and depicted intensity 302*n*. In some embodiments, for each of the depicted intensities 302*a*-302*n*, only the perception of how difficult the game task appears to the user changes (e.g., changes to path slope) while the amount of physical intensity and effort that the user 100 exerts to accomplish the game task for each depicted intensity stays the same. In other words, if the user 100 is presented with depicted intensity 302*n* where the hill is perceived as being less challenging to compared to hill associated with depicted intensity 302*a*, the amount of physical effort that it takes the user 100' to accomplish the climb the hill in depicted intensity 302*a* and depicted intensity 302*n* remains substantially the same. In this way, if a user that is on the brink of giving up on the gameplay is presented with a game task of climbing a hill that has a lower incline (e.g., depicted intensity 302*n*), the user may be more likely to continue with their gameplay since the hill with the lower incline would appear easier to climb.

As further illustrated in FIG. 3, as the user 100 interacts with the AR scene 204*n*, the system is configured to continually track and monitor the physical actions and the physiological measurements of the user. In some embodiments, at any point in time during the gameplay of the user, the system can dynamically adjust the depicted intensity 302*a* of the AR scene 204*n* if it is determined that the user 100 is struggling with the gameplay and on the verge of giving up. For example, as illustrated on the display 216, at time t1, the system may determine that the user 100 is breathing heavily, sweating profusely, and that the facial expression of the user indicates that the user is upset. Accordingly, at time t1, the system is configured to dynamically adjust the depicted intensity 302*a* to depicted intensity 302*b* which includes a hill with a lower incline and also appears easier to climb. In another example, at time t2, the system may further adjust the depicted intensity 302*b* to depicted intensity 302*n* which includes a hill with even a lower incline which also appears to be the easiest path to climb. As a result, the system is configured to lower the intensity of the depicted intensity to change its perception and to encourage the user to not give up. Alternatively, in other embodiments, the system is configured to increase the intensity of the depicted intensity to challenge a user who may find a game task too easy.

In other embodiments, if the user's facial expressions or other indicators show the user as being excited and positive with the gameplay, the system allows the user to continue along the path associated with the corresponding depicted intensity without making any changes or adjustments to the depicted intensities. For example, as illustrated at time t2, along the path of depicted intensity 302a, the user 100 and the avatar 100' of the user is smiling and expressing the words, "Yes!, I am almost at the top." Accordingly, although the user's physiological measurements may be at heightened levels, the user 100 is motivated to reach the top of the hill and the system would not make any adjustments to the depicted intensity 302a.

In some embodiments, a model can be used to dynamically adjust the depicted intensity 302 of the gameplay from one with a higher perceived difficulty level to one with a lower perceived difficulty level, e.g., reducing the incline of the hill. Conversely, in other embodiments, a model can be used to dynamically adjust the depicted intensity 302 so that the perceived difficulty appears more difficult for the user 100. For example, using the physiological measurements and gameplay data as inputs, the model may be used to determine that the user is bored with the game and is starting to give up. To encourage the user 100 to continue playing, the model is used to dynamically adjust the depicted intensity 302 so that the game task or obstacle in the AR scenes appears to be more difficulty and more challenging to the user. In some embodiments, the system is configured to change the depicted intensity 302 by dynamically adjusting the game code by changing the perception of the obstacle or challenge in the AR scene. In other embodiments, the adjustments of the depicted intensity 302 requires changing the game state parameters and game engine graphics to cause rendering of the game content with a corresponding intensity or difficulty setting. According, the model can be used to dynamically change the depicted intensity 302 of an AR scene 204 and can be used for implementing a self-enhancing filter where the physical features of the user is augmented in the AR scene. Thus, the self-esteem and confidence of users 100 can be improved and the users may be encouraged to continue interacting with the gameplay since the change in the depicted intensity of the video game may no longer appear too intimidating to the user.

Figure 4:
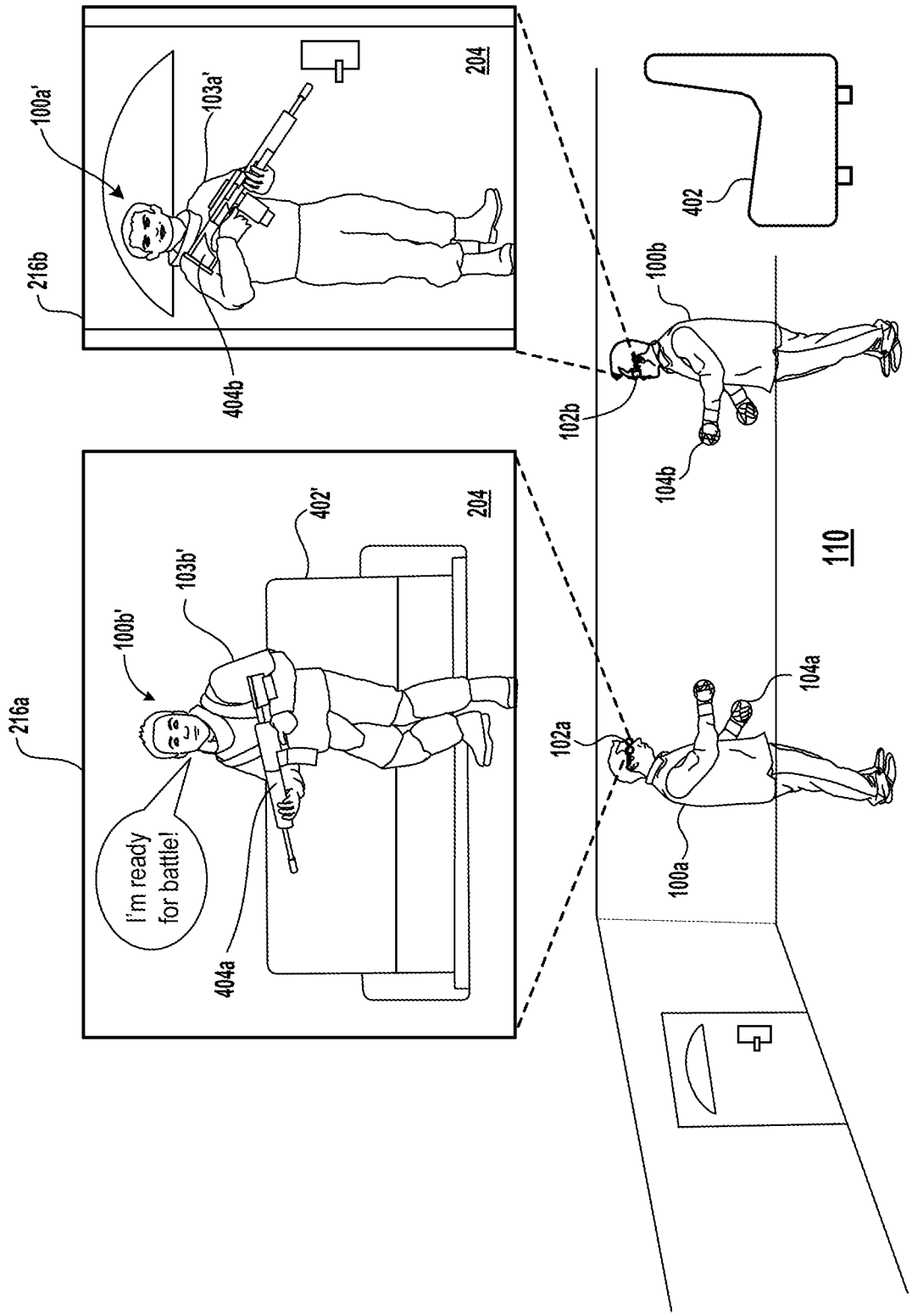
FIG. 4 illustrates an embodiment of users interacting in an AR environment via their respective AR HMDs and interface objects, in accordance with implementations of the disclosure.

FIG. 4 illustrates an embodiment of users 100a-100b interacting in an AR environment via their respective AR HMDs 102 and interface objects 104. As shown, user 100a and 100b are physically located in a real-world space 110 using an AR HMD 102 and interface object 104 to interact with one another in the AR environment. In particular, users 100a-100b are shown in a living room of their house strategizing with one another on how to accomplish a game task that involves a battle scene. In the illustrated example, a display 216a of the AR HMD 102a of user 100a illustrates an adjusted AR scene 204n from the FOV of user 100a. In particular, the display 216a illustrates an avatar 100b' representing user 100b holding a virtual object 404a (e.g., gun) and a real-world object 402 (e.g., couch). In some embodiments, the avatar 100b' of user 100b includes a virtual body 103b' representing the body of user 100b which includes various physical features that have been modified, e.g., virtual arms, virtual legs, etc. In the illustrated example, the size and shape of the virtual arms and virtual legs are a modification of the real arms and legs of the user 100b which results in the virtual arms and virtual legs being larger and greater muscular features. As a result, the system is configured to change the appearance of a teammate or other users in the AR scene so that the teammate appears more intimidating or more confident compared to how they may actually look in real life.

In some embodiments, the system is configured to change the sound of a user's voice. For example, as illustrated on the display, when avatar 100b' asserts the phrase, "I'm ready for battle," the system is configured to make adjustments to the sound (e.g., pitch, tone, volume, intensity, speed, etc.) of the voice of the user 100b so that avatar 100b' sounds more intimating, confident, or excited in the AR scene. As further illustrated in FIG. 4, a display 216b of the AR HMD 102b of user 100b illustrates an adjusted AR scene 204n from the FOV of user 100b. In particular, the display 216b illustrates an avatar 100a' of user 100a holding a virtual object 404b (e.g., gun) while standing in front of a real-world door. In some embodiments, the avatar 100a' of user 100a includes a virtual body 103a' representing the body of user 100a which includes various physical features of user 100a that have been adjusted in shape and size. In the illustrated example, the size and shape of the virtual body 103a' of user 100a is larger and more muscular than the real body of user 100a.

In some embodiments, a model can be used to dynamically modify the physical features of the users 100a-100b to produce a virtual mesh of the physical features of the users which can change in size and shape for rendering on the display of the respective users. In one embodiment the model may be able to receive as inputs a profile of the user, user captured physiological measurements, user captured physical measurements, and gameplay data for modifying the physical features of the users. For example, referring to FIG. 4, the physical measurements associated with user 100b may indicate that the user is 105 lbs. and has an unathletic body structure. The gameplay data may indicate that users 100a-100b will be in interacting in a battle fight scene against enemy soldiers. Based on the noted inputs, the model can be used to generate an avatar 100b' of the user 100b with physical features that appears more athletic and intimating when viewed in the adjusted AR scene, e.g., adjusting size, shape, geometry etc. to make the user appear more athletic. In this way, when user 100a fights alongside 100b during in the fight scene, user 100a may feel more confident when fighting alongside user 100b since the avatar 100b' of user 100b appears more aggressive and intimidating.

FIG. 5 illustrates an embodiment of a table 502 that includes various captured measurements 504 that correspond to a user 100 during the user's interaction with AR scenes of an AR environment. As shown, the captured measurements 504 include physiological measurements and physical measurements of a user 100 and its corresponding adjusted values 506. In one embodiment, while the user 100 interacts with the AR interactive content, the system is configured to capture various physiological measurements associated with the user during gameplay. In one example, the physiological measurements may include heart rate, blood pressure, oxygen saturation, respiration, body temperature, etc. As further illustrated, the captured measurements 504 may include various physical measurements associated with the user 100 such as height, body weight, body fat percentage, etc.

In some embodiments, the system is configured to determine the corresponding adjusted values 506 which may be used to represent the physiological and physical measurements of an avatar 100' of a user 100 in the virtual environment. To provide an illustration of the captured measurements 504 of a user 100 and its corresponding adjusted values 506, in one example, the system may determine that based on the gameplay data, the user 100 is interacting with an AR scene that involves a combat fight scene with an enemy game character. Further, based on the captured measurements of the user, the user is 5'2" tall and weighs 260 lbs with a 45% body fat percentage. As further shown, the system can determine that the heart rate of the user is 120 (BPM) and the user is breathing and sweating excessively. Accordingly, to boost the self-esteem of the user and to provide the user with confidence that the user can beat the enemy game characters, the system is configured to generate the corresponding adjusted values 506 for the avatar 100' of the user 100 to make it appear that the avatar 100' is more athletic and in better shape than the user 100 is in real life.

As illustrated, the adjusted values 506 corresponding to the physical measurements of the avatar 100' of the user indicates that the avatar 100' is 6'2" tall and weighs 205 lbs with an 18% body fat percentage. Further, the adjusted values 506 corresponding to the physiological measurements of the avatar 100' indicates that the heart rate of the user is 85 (BPM). In one embodiment, the system may adjust the amount of perspiration of a user. For example, if a user 100 is sweating excessively, the system may adjust the perspiration intensity of the avatar to a lower intensity. In some embodiments, the system is configured to adjust the sound made by the avatar 100' such as its respiration so that the sound associated with the breathing of the avatar 100' is reduced, e.g., breathing more controlled and steadily rather than gasping for air. Accordingly, the adjusted values 506 may provide the user 100 with the perception that the user has a greater level of endurance and physical fitness in the AR environment relative to the real world of the user. In this way, the user 100 may feel more confident when interacting in AR scenes that may require intense physical movements and actions. As a reference, the table shown in FIG. 5 may further include a range 508 of various physiological and physical measurements for a healthy user. In one embodiment, the range 508 can be used as reference when generating the adjusted values 506.

Figure 6:
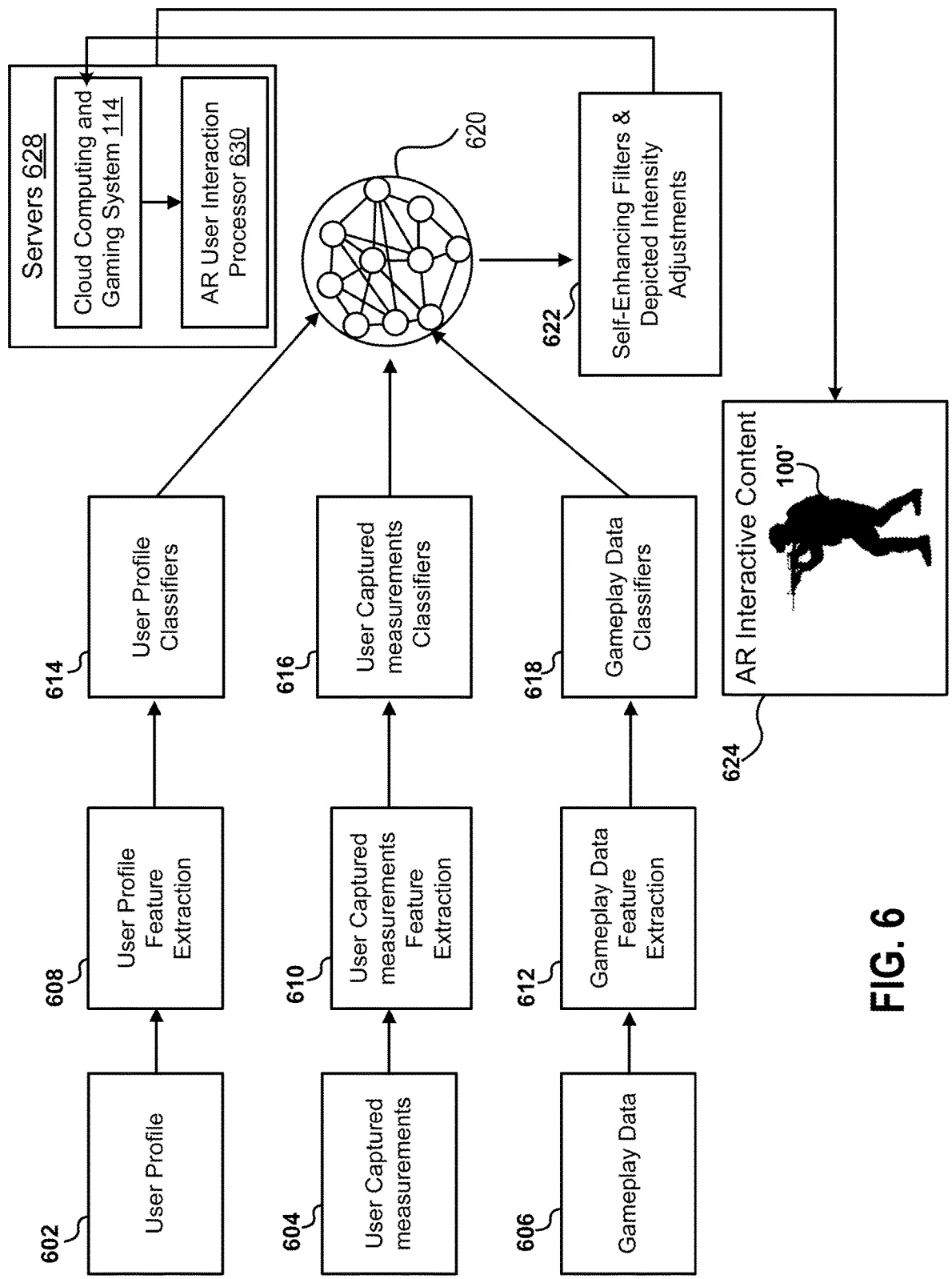
FIG. 6 illustrates an embodiment of a method for using a model to dynamically adjust AR scenes for rendering on a display for a user using a user profile, user captured physiological measurements, and gameplay data as inputs, in accordance with implementations of the disclosure.

FIG. 6 illustrates an embodiment of a method for using a model 620 to dynamically adjust AR scenes for rendering on a display for a user using a user profile 602, user captured measurements 604, and gameplay data 606 as inputs. As noted above, adjusting the AR scenes may be performed in substantial real-time where self-enhancing filters can be implemented to modify the physical features of a user. As also noted above, in some embodiments, adjusting the AR scenes may include adjusting the depicted intensity of a corresponding AR scene so that a game task or challenge is perceived as being more feasible to accomplish. In this way, this facilitates an enhanced and improved AR experience for users with low self-esteem since the users may feel more confident with themselves when their physical features appear more athletic in the AR scene and the AR scene appears less intimidating to the user. In turn, this would encourage the users to continue with their gameplay rather than giving up and ending the AR interaction session.

As shown in FIG. 6, in one embodiment, the system may include feature extraction operations (e.g., 608, 610, 612) that are configured to identify various features in the user profile 602, the user captured measurements 604, and the gameplay data 606. After the feature extraction operations identifies the features associated with the inputs, classifier operations (e.g., 614, 616, 618) may be configured to classify the features using one or more classifiers. In some embodiments, the system includes a model 620 of the user that is configured to receive the classified features from the classifier operations. Using the classified features, the model 620 can be used to modify the physical features of a user by implementing self-enhancing filters and to adjust the depicted intensity of an AR scene. In some embodiments, operation 622 can use the model 620 to determine which physical features of the user to modify and the adjustments to be made to the depicted intensity of an AR scene.

In another embodiment, a cloud computing and gaming system 114 located at server 628 may receive the modified physical features of the user and the adjusted depicted intensity of the AR scene from operation 622 for processing. In some embodiments, the cloud computing and gaming system 114 may work together with an AR user interaction processor 630 to process the modified physical features of the user and the adjusted depicted intensity of the AR scene to generate the adjusted AR scene which includes the AR interactive content. In one embodiment, at operation 624, the user is configured to receive the AR interactive content which can be rendered on a display of a user wearing AR glasses.

In one embodiment, the system can process the user profile 602. The user profile 602 may include various attributes and information associated with user 100 such as personality characteristics (e.g., confident, timid, low self-esteem, optimistic, pessimistic, risk taker, etc.) gameplay tendencies, behavior tendencies, viewing history, preferences, interests, disinterests, etc. In other embodiments, the user profile 602 may include various physical measurements associated with the user such as height, body weight, body fat percentage, skin tone, skin texture, and any other attributes associated with the physical features of the user. In some embodiments, the user profile extraction 608 operation is configured to process the user profile 602 to identify and extract features associated with the profile of the user 100. After the user profile extraction 608 operation processes and identifies the features from the user profile 602, the user profile classifiers 614 operation is configured to classify the features using one or more classifiers. In one embodiment, the features are labeled using a classification algorithm for further refining by the model 620.

In another embodiment, the system can process the user captured physiological measurements 604. In some embodiments, the user captured measurements 604 may include various physiological measurements associated with the user such as heart rate, blood pressure, oxygen saturation, respiration, body temperature, etc. As noted above, the physical actions of the user are continuously monitored and tracked during the user's interaction with the AR environment. While the user interacts with the AR environment, the system is configured to track and capture the physiological measurements of the user at any point during the gameplay. In other embodiments, the user captured measurements 604 may also include various captured attributes and information associated with the actions of the user such as body movement data, facial expression, data, eye gaze data, voice capture data, face capture data, controller input data, etc. For example, a user 100 may be interacting with an AR scene that involves the user fighting against an enemy character that is larger and appears physically stronger than the user. Based on the profile of the user, captured heart rate data, and facial capture data, the system may determine that the user is scared and intimidated by the enemy character. Accordingly, the system may modify the physical features of the user to make it appear that the avatar of the user in the AR scene appears larger and physically stronger than the enemy character.

In some embodiments, the user captured measurements feature extraction 610 operation is configured to process the user captured measurements 604 to identify and extract features associated with the user captured measurements of the user. After the user captured measurements feature extraction 610 operation processes and identifies the features from the user captured measurements 604, the user captured measurements classifiers 616 operation is configured to classify the features using one or more classifiers. In one embodiment, the features are labeled using a classification algorithm for further refining by the model 620.

In another embodiment, the system can process the gameplay data 606. In one embodiment, the gameplay data 606 may include a variety of information associated with the context of the AR environment that the user is interacting in such as real-world space, real-world objects, virtual objects, date, time, contextual data regarding the interaction, etc. In some embodiments, the gameplay data feature extraction 612 operation is configured to process the gameplay data 606 to identify and extract features associated with the gameplay data of the user. After the gameplay data feature extraction 612 processes and identifies the features from the gameplay data 606, the gameplay data classifiers 618 operation is configured to classify the features using one or more classifiers. In some embodiments, the features are labeled using a classification algorithm for further refining by the model 620.

In some embodiments, the model 620 is configured to receive as inputs the classified features (e.g., user profile classified features, user captured measurements classified features, gameplay data classified features). In another embodiment, other inputs that are not direct inputs or lack of input/feedback, may also be taken as inputs to the model 620. The model 620 may use a machine learning model which can be used to modify the physical features of a user by implementing self-enhancing filters and to adjust the depicted intensity of an AR scene. In other embodiments, the model 620 can receive as input feedback data such as data related to updates to the user captured measurements that is responsive to the adjusted AR scenes.

In one example, a user profile 602 associated with a user may indicate that the user has the tendency to give up on and end their gameplay session if a game task appears too challenging or too difficult. Further, the gameplay data 606 may indicate that the user is interacting with AR interactive content that includes a fight scene with multiple enemy soldiers. While interacting with the AR interactive content, based on the user captured measurements 604 associated with the user, the system may determine that the user has a facial expression that indicates that the user is overwhelmed and that the blood pressure of the user excessive. As a result, the system may infer that the depicted intensity 302 associated with the AR interactive content is too intense and that the user may end the gameplay session. Accordingly, using the user profile 602, the user captured measurements 604, and the gameplay data 606, the model 620 may be used to adjust the depicted intensity 302 associated with the AR interactive content. In one example, the system may adjust the depicted intensity 302 by minimizing the number of enemy soldiers, modifying the physical features of the enemy soldiers to make them appear less intimating, or any other changes associated with the intensity of the AR interactive content so that the user is not overwhelmed by the AR content. In other embodiments, the model 620 may be used to adjust and modify the physical features of the user. For example, the model can be used to add additional body extremities (e.g., arms, legs, etc.) to the avatar of the user and change the sound of the voice of the user to provide the user with a perception that the user appears and sounds more physically intimidating and confident.

In some embodiments, operation 622 can use the model 620 to determine the type of adjustments to be make to the depicted intensity 302 of an AR scene and the type of self-enhancing filters to implement for modifying the physical features of the user. Once the data associated with the adjustments to the depicted intensity 302 and the self-enhancing filters are determined, the data is received by server 628 for processing. In some embodiments, the server 628 may include the cloud computing and gaming system 114 and the AR user interaction processor 630. In one embodiment, the cloud computing and gaming system 114 may receive the adjustments to the depicted intensity and adjustments to the physical features of the user for processing. In one embodiment, the cloud computing and gaming system 114 is configured to generate the AR interactive content and context of the environment which may include various AR scenes. In one embodiment, the AR scenes are continuously updated based on the interaction of the user and progression of the user's interactivity.

In some embodiments, the cloud computing and gaming system 114 may work together with an AR user interaction processor 630 to render the adjusted depicted intensity and the modified physical features of the user within the adjusted AR scene. For example, the AR user interaction processor 630 may determine the user's facial expression indicates that the user is intimidated by climbing up a hill with a steep incline. Accordingly, the cloud computing and gaming system 114 may infer that the user would have a more enjoyable AR experience if the hill did not appear as steep and render a hill with a lower depicted intensity that includes a hill with a lower incline.

After the cloud computing and gaming system 114 the AR user interaction processor 630 produces the AR interactive content, operation 624 is configured to receive the AR interactive content so that the user 100 can interact with the AR interactive content. In one embodiment, the AR interactive content may include the adjusted AR scene that includes the various adjustments made to the depicted intensity 302 of an AR scene and the implementation of self-enhancing filters for modifying the physical features of the user. In some embodiments, while the user interacts with the adjusted AR scenes, operation 604 can continuously receive feedback and updates to the user captured measurements as the user responds to the modified AR scenes. This feedback can be configured to assess the user's response to the adjustments that are made to the AR scene. The feedback may be explicit or implied by the user. For example, if the incline of a hill in an AR scene is reduced to have an incline that is less steep and the user continues to express a facial expression that indicates that the user is overwhelmed, the incline of the hill can be further reduced. Accordingly, various inferences can be captured by feedback of the user and incorporated into the user captured measurements 604 and the user profile 602 which can help provide a more accurate adjustments to the depicted intensity and physical features of the user.

Figure 7:
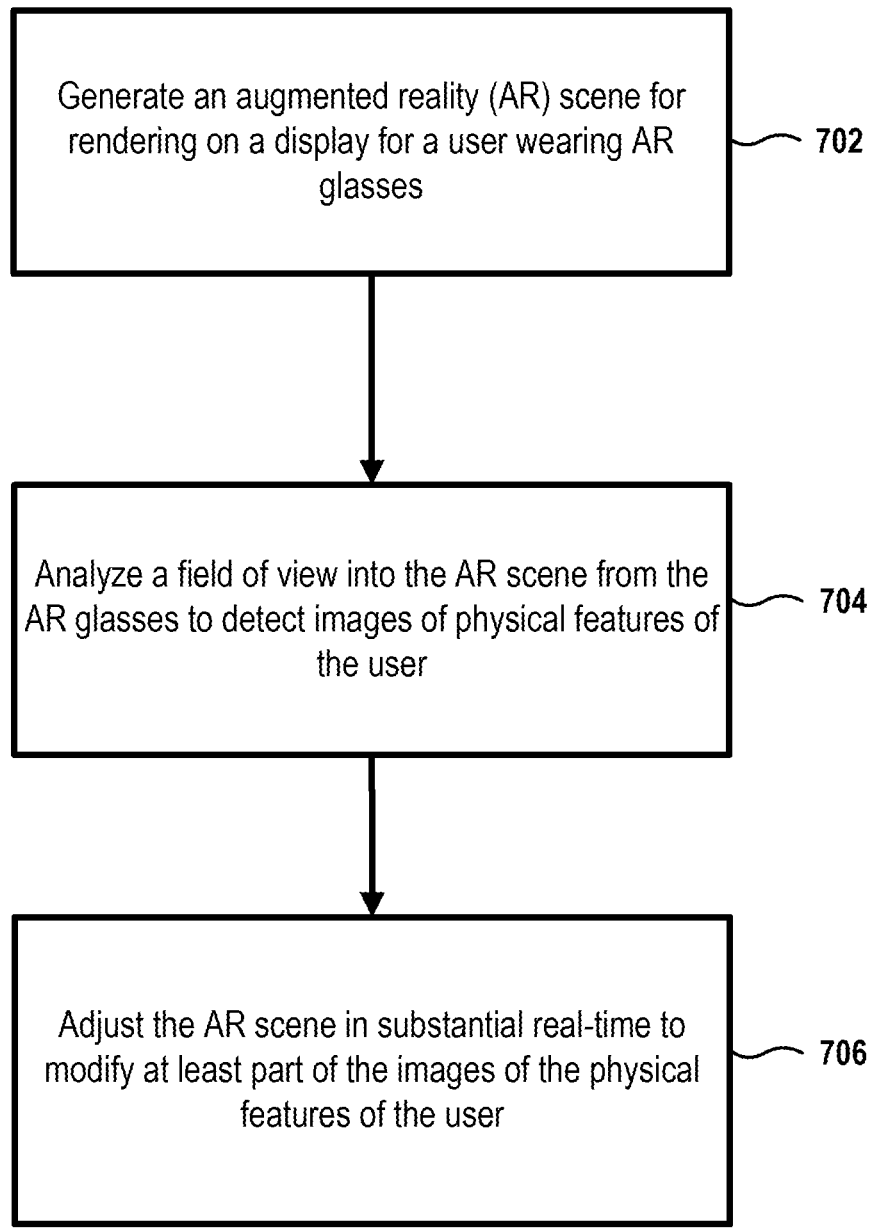
FIG. 7 illustrates a method for generating an AR scene for a user and adjusting the AR scene to include modified images of the physical features of the user, in accordance with implementations of the disclosure.

FIG. 7 illustrates a method for generating an AR scene for a user and adjusting the AR scene to include modified images of the physical features of the user. In one embodiment, the method described in FIG. 7 provides the user with a greater sense of self-confidence since the physical features of the user can be modified to make the user appear more athletic and stronger in the AR environment. This can result in the user having an enhanced and improved AR experience since the user may be more confident and less intimidating by obstacles or challenges in the AR environment. In one embodiment, the method includes an operation 702 that is configured to generate an augmented reality (AR) scene for rendering on a display for a user wearing AR glasses. In some embodiments, the AR scene includes a real-world space and virtual objects overlaid in the real-world space. For example, a user may be wearing AR goggles that includes a display. While immersed in the AR environment that includes both real-world objects and virtual objects, the user can interact with the various virtual objects and the real-world objects that are displayed to the user.

The method shown in FIG. 7 then flows to operation 704 where the operation is configured to analyze a field of view into the AR scene from the AR glasses to detect images of physical features of the user. In one embodiment, operation 704 is configured to detect images of physical features of the user (or other users) when the field of view is directed toward at least part of the physical features of the user. For example, as the user moves around and looks around in different directions within the AR environment, the FOV 108 of the AR HMD 102 may detect the physical features of the user such as the user's hands, arms, abdominals, legs, feet, etc. In another example, the FOV 108 of the AR HMD 102 may detect the physical features of the other users and game characters in the AR environment. In some embodiments, operation 704 is configured to use an externally facing camera to detect the various physical actions of the user such as the as body movement data, eye gaze data, voice capture data, face capture data, and controller input data.

The method flows to operation 706 where the operation is configured to adjust the AR scene in substantial real-time to modify at least part of the images of the physical features of the user or physical features of other users that are detected to be in the AR scene as viewed from the field of view of the AR glasses. In some embodiments, operation 706 is configured to modify the images of the physical features of the user which includes detecting depth data and original texture data from the physical features to produce a virtual mesh of said physical features. In one embodiment, the virtual mesh can be rendered in the AR scene to represent the physical features of the user in 3D. In some embodiments, the virtual mesh can change in size and shape and be deformed to achieve a particular configuration. For example, the system may increase or decrease the size and shape of the physical features by a magnitude to produce the virtual mesh or by any factor that would be preferred by the user. In other embodiment, the virtual mesh can be rendered using modified texture data that blends with the original texture data. For example, the blending of the modified texture data and the original texture data may result in the virtual mesh appearing continuous and integrated along a boundary between the modified texture data and the original texture data.

Figure 8:
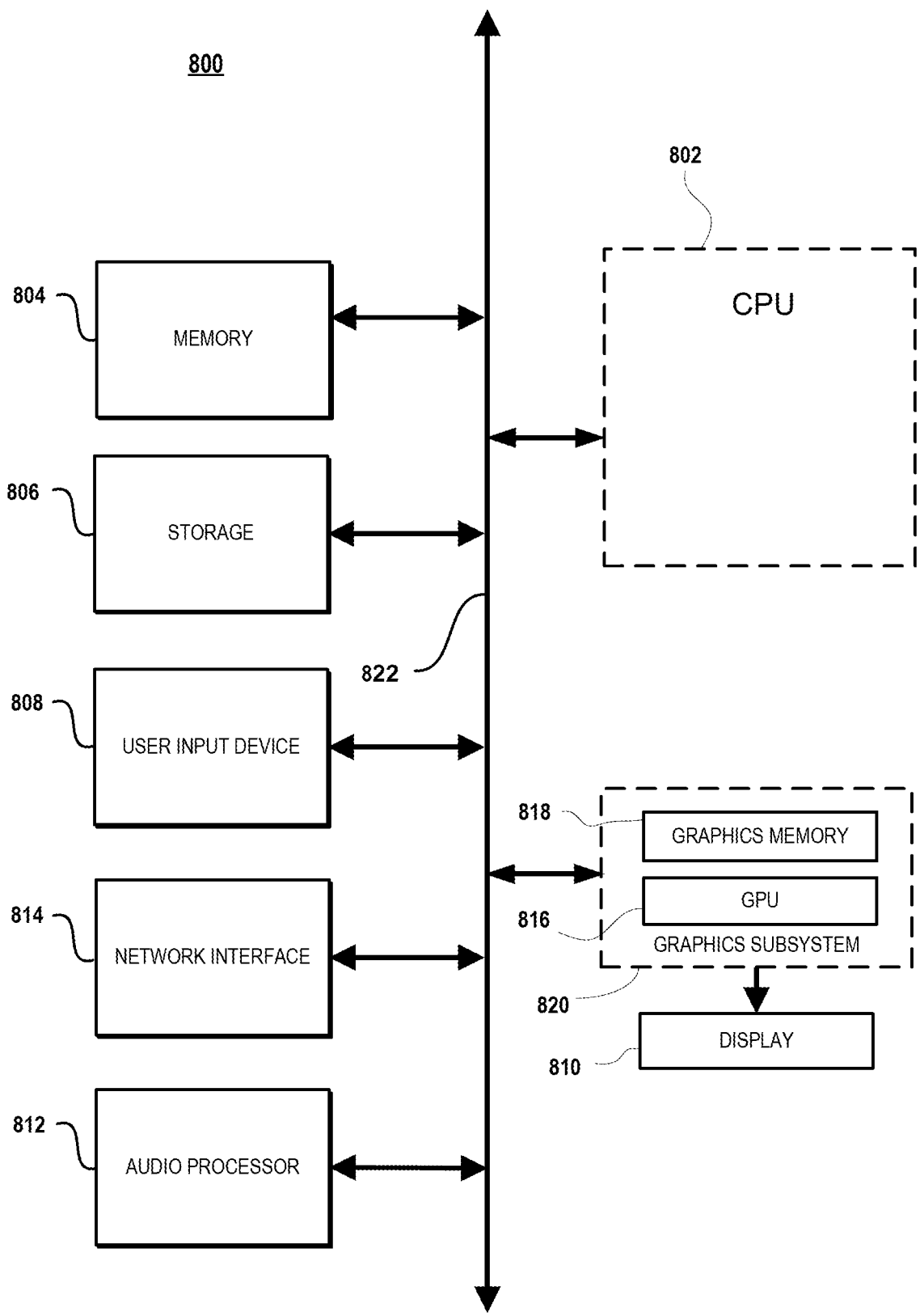
FIG. 8 illustrates components of an example device that can be used to perform aspects of the various embodiments of the present disclosure.

FIG. 8 illustrates components of an example device 800 that can be used to perform aspects of the various embodiments of the present disclosure. This block diagram illustrates a device 800 that can incorporate or can be a personal computer, video game console, personal digital assistant, a server or other digital device, suitable for practicing an embodiment of the disclosure. Device 800 includes a central processing unit (CPU) 802 for running software applications and optionally an operating system. CPU 802 may be comprised of one or more homogeneous or heterogeneous processing cores. For example, CPU 802 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 800 may be a localized to a player playing a game segment (e.g., game console), or remote from the player (e.g., back-end server processor), or one of many servers using virtualization in a game cloud system for remote streaming of gameplay to clients.

Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to device 800, examples of which may include keyboards, mice, joysticks, touch pads, touch screens, still or video recorders/cameras, tracking devices for recognizing gestures, and/or microphones. Network interface 814 allows device 800 to communicate with other computer systems via an electronic communications network, and may include wired or wireless communication over local area networks and wide area networks such as the internet. An audio processor 812 is adapted to generate analog or digital audio output from instructions and/or data provided by the CPU 802, memory 804, and/or storage 806. The components of device 800, including CPU 802, memory 804, data storage 806, user input devices 808, network interface 810, and audio processor 812 are connected via one or more data buses 822.

A graphics subsystem 820 is further connected with data bus 822 and the components of the device 800. The graphics subsystem 820 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 808, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 810. Display device 810 can be any device capable of displaying visual information in response to a signal from the device 800, including CRT, LCD, plasma, and OLED displays. Device 800 can provide the display device 810 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method, comprising:
generating an augmented reality (AR) scene for rendering on a display for a user wearing AR glasses, the AR scene includes a real-world space and virtual objects overlaid in the real-world space;
analyzing a field of view into the AR scene from the AR glasses, the analyzing is configured to detect images of physical features of the user when the field of view is directed toward at least part of said physical features of the user, and capturing one or more measurements of the user during user interactivity of the AR scene;
adjusting the AR scene, in substantial real-time, to modify at least part of the images of the physical features of the user when the physical features of the user are detected to be in the AR scene as viewed from the field of view of the AR glasses, wherein said modifying includes detecting depth data and original texture data from said physical features to produce a virtual mesh of said physical features, the virtual mesh is changed in size and shape and rendered using modified texture data that blends with said original texture data, and further adjusting a depicted intensity of the AR scene to produce the adjusted AR scene in response to the one or more measurements of the user during user interactivity of the AR scene;
wherein said modified physical features of the user appear to the user when viewed via the AR glasses as existing in the real-world space.

2. The computer-implemented method of claim 1, wherein the virtual mesh is a three-dimensional (3D) representation of the physical features of the user used for rendering in the AR scene, said virtual mesh representing at least part of an avatar of the user in the AR scene.

3. The computer-implemented method of claim 1, wherein the size and the shape of the virtual mesh is increased or decreased by a magnitude relative to corresponding said physical features that is preferred by the user.

4. The computer-implemented method of claim 1, wherein the size and the shape of the virtual mesh is determined based on a profile of the user and gameplay data.

5. The computer-implemented method of claim 1, wherein the blending of the modified texture data and the original texture data causes the virtual mesh to appear dynamically integrated along a boundary between the modified texture data and the original texture data.

6. The computer-implemented method of claim 1, wherein the analyzing is configured to further detect images of physical features of one or more additional users when the field of view of the user is directed toward at least part of said physical features of the one or more additional users to modify the images of physical features of the one or more additional users.

7. The computer-implemented method of claim 1, wherein the adjustment to the depicted intensity of the AR scene increases or decreases a perceived difficulty associated with the AR scene by the user.

8. The computer-implemented method of claim 1, wherein the one or more measurements is captured using one or more sensors that are used to track a heart rate, or a blood pressure, or an oxygen saturation, or a respiration, or a body temperature, or an eye gaze, or a face expression, or a voice, or controller movement, or a body movement, or controller input associated with the user, or a combination of two or more thereof.

9. The computer-implemented method of claim 1, wherein the one or more measurements is adjusted to produce one or more virtual measurements that correspond to an avatar of the user, said one or more virtual measurements is perceived by the user has having greater athletic endurance.

10. The computer-implemented method of claim 1, wherein the adjustment to the depicted intensity of the AR scene increases or decreases a perceived difficulty associated with the AR scene by the user while a physical intensity of the user for interactivity with the adjusted AR scene remains substantially the same.

11. A computer-implemented method, comprising:
generating an augmented reality (AR) scene for rendering on a display for a user wearing AR glasses, the AR scene includes a real-world space and virtual objects overlaid in the real-world space;
analyzing a field of view into the AR scene from the AR glasses, the analyzing is configured to detect images of physical features of the user when the field of view is directed toward at least part of said physical features of the user and capturing a sound produced by the user during user interactivity of the AR scene;
adjusting the AR scene, in substantial real-time, to modify at least part of the images of the physical features of the user when the physical features of the user are detected to be in the AR scene as viewed from the field of view of the AR glasses, wherein said modifying includes detecting depth data and original texture data from said physical features to produce a virtual mesh of said physical features, the virtual mesh is changed in size and shape and rendered using modified texture data that blends with said original texture data, and further adjusting a feature associated with the sound to produce a virtual sound to represent a sound produced by an avatar of the user in the adjusted AR scene, said feature includes pitch, tone, volume, intensity, speed, or a combination of two or more thereof;
wherein said modified physical features of the user appear to the user when viewed via the AR glasses as existing in the real-world space.

12. The computer-implemented method of claim 1, wherein modifying the images of the physical features further includes processing a profile of the user, captured measurements of the user, and gameplay data through model of the user, the model configured to identify features from the profile of the user, the captured measurements of the user, and the gameplay data to classify attributes of the user, the attributes of the user being used to select the modify the physical features and to adjust a depicted intensity of the AR scene.

13. A system for displaying an augmented reality (AR) scene, the system comprising:
an AR head mounted display (HMD), said AR HMD includes a display for rendering the AR scene for a user wearing AR glasses, said AR scene includes a real-world space and virtual objects overlaid in the real-world space; and said AR HMD configured to analyze a field of view into the AR scene from the AR glasses, the analyzing is configured to detect images of physical features of the user when the field of view is directed toward at least part of said physical features of the user;
a processing unit associated with the AR HMD for adjusting the AR scene in substantial real-time to modify at least part of the images of the physical features of the user when the physical features of the user are detected to be in the AR scene as viewed from the field of view of the AR glasses and wherein one or more of the physical features are measured during user interactivity with the AR scene, wherein said modifying includes detecting depth data and original texture data from said physical features to produce a virtual mesh of said physical features, the virtual mesh is changed in size and shape and rendered using modified texture data that blends with said original texture data;
wherein said modified physical features of the user appear to the user when viewed via the AR glasses as existing in the real-world space; and
a tracking unit associated with the AR HMD for tracking the field of view into the AR scene from the AR glasses, the tracking is configured to identify movements of the physical features of the user for further adjusting of the AR scene in substantial real-time to incorporate the movements of the physical features of the user and adjust a depicted intensity in the AR scene.

14. The system of claim 13, wherein the AR HMD includes a three-dimensional (3D) camera that is configured to detect the depth data and the original texture data from the physical features.

15. The system of claim 13, wherein the virtual mesh is a three-dimensional (3D) representation of the physical features of the user used for rendering in the AR scene, said virtual mesh representing at least part of an avatar of the user in the AR scene.

16. The system of claim 13, wherein the size and the shape of the virtual mesh is increased or decreased by a magnitude relative to corresponding said physical features that is preferred by the user.

17. The system of claim 13, wherein the blending of the modified texture data and the original texture data causes the virtual mesh to appear dynamically integrated along a boundary between the modified texture data and the original texture data.

18. The system of claim 13, wherein the analyzing is configured to detect images of physical features of one or more additional users when the field of view of the user is directed toward at least part of said physical features of the one or more additional users to modify the images of physical features of the one or more additional users.

* * * * *